UNITED STATES PATENT OFFICE.

JOSEPH E. HOGAN, OF NEW YORK, N. Y.

BELT.

1,394,414.     Specification of Letters Patent.     Patented Oct. 18, 1921.

No Drawing.     Application filed June 22, 1920. Serial No. 390,863.

*To all whom it may concern:*

Be it known that I, JOSEPH E. HOGAN, a citizen of the United States, residing at New York city, in the county of New York and State of New York, have invented new and useful Improvements in Belts, of which the following is a specification.

This invention relates to the composition and method of making waist-line belts, and the principal object is the production of such an article having a composition which shall reduce perspiration and prevent friction, act as a nonconductor of heat, be possessed of great tensile strength and be to a certain degree elastic so as to conform to the various movements and posture of the body of the wearer.

My composition consists of a mixture of rubber which may be either of high-grade or be reclaimed rubber with powdered or pulverized cork, and a binding substance such as rosin.

In preparing the composition I prefer to use the ingredients in about the following proportion—viz. 100 cubic inches of rubber, 135 cubic inches of cork, and 4 to 8 cubic inches of rosin. These proportions may be greatly varied, but I find that the above proportions are best.

In the process of combining these elements the rubber is first reduced to a kneadable condition by heating it. It is then passed through heat rollers and the rosin and pulverized cork are applied thereto. The mass is rolled and doubled and redoubled and kneaded during the addition of the cork until all of the ingredients are incorporated into a relatively homogeneous mass. This mass is then rolled out into a sheet and permitted to congeal, after which it is placed in the mold and vulcanized.

The resulting belt has a slight degree of elasticity with as great or greater tensile strength than canvas or leather. It is also a non-conductor of heat, does not cause the friction that a leather belt creates, and being non-absorbent does not take up the body moisture and consequently does not grow hard and crack from being exposed to moisture as is the case with leather. It is more easily and cheaply manufactured than belts having a fabric core coated with a layer of rubber.

When new rubber is used in carrying the present invention into effect, sulfur is used in the composition. But when reclaimed rubber is used, this already contains sulfur and it is unnecessary to use more. It is preferable to use reclaimed rubber on which the sulfur does not come out on the stock as a white powder or crystal, and which is therefore known as "non-blooming" stock.

While I have described what I deem to be the preferred formula and process for making the material, it is obvious that many of the details may be varied without departing from the spirit of my invention; and I therefore do not limit myself to the exact details of composition, process or use herein set forth nor to anything less than the whole of my invention limited only by the appended claims.

What I claim as new and desire to secure by Letters Patent is:—

1. A waist line belt made from a composition of rubber, cork in powdered form, and a binder, so combined as to provide a slightly elastic, non-absorbent article of great tensile strength.

2. A waist line belt molded from a homogeneous composition of rubber, cork in powdered form, and a binder.

3. A waist line belt made from a homogeneous composition of rubber, cork in powdered form, and rosin.

4. A waist line belt made from a composition comprising one hundred cubic units of rubber, one hundred to one hundred thirty-five cubic units of powdered cork, and four to eight cubic units of rosin.

In testimony whereof I have affixed my signature.

JOSEPH E. HOGAN.